(12) United States Patent
Chavez et al.

(10) Patent No.: US 10,529,248 B2
(45) Date of Patent: Jan. 7, 2020

(54) AIRCRAFT PILOT TRAINING SYSTEM, METHOD AND APPARATUS FOR THEORY, PRACTICE AND EVALUATION

(71) Applicant: Embraer S.A., São José dos Campos-SP (BR)

(72) Inventors: Nilson Emanuel Bezerra Chavez, São José dos Campos (BR); Guilherme De Miranda Cara, São José dos Campos (BR); Nelson Jose Issa De Macedo, São José dos Campos (BR)

(73) Assignee: EMBRAER S.A., Sao Jose dos Campos-SP (BR)

( * ) Notice: Subject to any disclaimer, the term of this patent is extended or adjusted under 35 U.S.C. 154(b) by 0 days.

(21) Appl. No.: 14/741,175

(22) Filed: Jun. 16, 2015

(65) Prior Publication Data
US 2016/0019808 A1    Jan. 21, 2016

Related U.S. Application Data (60) Provisional application No. 62/014,406, filed on Jun. 19, 2014.

(51) Int. Cl.
*G09B 9/30* (2006.01)
*G09B 5/06* (2006.01)
*G09B 9/24* (2006.01)

(52) U.S. Cl.
CPC .............. *G09B 9/302* (2013.01); *G09B 5/06* (2013.01); *G09B 9/24* (2013.01)

(58) Field of Classification Search
CPC ... G09B 9/00; G09B 9/02; G09B 9/04; G09B 9/06; G09B 9/08; G09B 9/302; G09B 5/06; G09B 9/24
See application file for complete search history.

(56) References Cited

U.S. PATENT DOCUMENTS

| | | | | |
|---|---|---|---|---|
| 5,803,738 A | * | 9/1998 | Latham | B25J 9/1656 345/157 |
| 6,106,298 A | * | 8/2000 | Pollak | G09B 9/003 434/29 |
| 8,390,680 B2 | * | 3/2013 | Perez | G06F 3/017 348/77 |

(Continued)

OTHER PUBLICATIONS

Covelli, Javier (Jeff), et al., "Using Mixed-Reality for Simulator Situation-Awareness," Interservice/Industry Training, Simulation, and Education Conference (I/ITSEC), 2005, Paper No. 2091, 8 pages.

(Continued)

*Primary Examiner* — Timothy A Musselman
(74) *Attorney, Agent, or Firm* — Nixon & Vanderhye, P.C.

(57) ABSTRACT

A system and method for training an aircraft pilot employs a station that delivers training lessons in the form of output and also receives input data from the trainee. An apparatus comprising a computational system is capable of displaying content from different types of media, including virtual reality, augmented reality, and variations. A mixed reality environment interacts with a human being, simulating the response of real objects, and also provides necessary information to achieve Learning Objectives for a specific part of training. A register or record of the interactions is used for evaluation.

17 Claims, 7 Drawing Sheets

1- Trainee
2- Computer
3- Sensor
4- Head Mounted Display (HMD)
5- Physical Mockup
6- Instructor
7- Instructor Display
8- Camera
9- Audio (56) References Cited

U.S. PATENT DOCUMENTS

| | | | |
|---|---|---|---|
| 8,613,620 B2* | 12/2013 | Barasch | A63B 24/0003 |
| | | | 434/247 |
| 9,583,019 B1* | 2/2017 | Schwartz | G09B 9/16 |
| 2014/0057229 A1* | 2/2014 | Groteluschen | G09B 9/006 |
| | | | 434/18 |
| 2015/0097719 A1* | 4/2015 | Balachandreswaran | ..... |
| | | | G01B 11/002 |
| | | | 342/147 |

OTHER PUBLICATIONS

Foyle, David C., et al., "Situation Awareness in an Augmented Reality Cockpit: Design, Viewpoints and Cognitive Glue," Proceedings of the 11th International Conference on Human Computer Interaction, Las Vegas, NV, 2005, 10 pages.

* cited by examiner

AIRCRAFT PILOT TRAINING SYSTEM, METHOD AND APPARATUS FOR THEORY, PRACTICE AND EVALUATION

CROSS-REFERENCE TO RELATED APPLICATIONS

This application claims the benefit of U.S. Provisional Patent Application No. 62/014,406 filed Jun. 19, 2014, incorporated herein by reference.

STATEMENT REGARDING FEDERALLY SPONSORED RESEARCH OR DEVELOPMENT

None.

FIELD

This technology relates to computerized aircraft pilot training systems, in particular those that employ virtual and augmented reality techniques, using environments comprised by computer(s) and/or device(s) that permit immersion, interaction, simulation and/or feedback to trainee(s).

BACKGROUND

Because large aircraft are expensive and complicated to operate, training a pilot how to fly a large airplane often begins with simulations. Aircraft pilot training for a specific aircraft often employs computer based resources. Usually, the training is divided into three parts: (1) ground school, often using Computer Based Training, or CBT; (2) procedures training, often using a Flight Training Device (FTD); and (3) flight maneuvers sessions, using a full flight simulator and then finally actual aircraft. Regarding the entire training, there are specific Learning Objectives (abbreviated LO) that a pilot must achieve for being considered proficient to operate an aircraft class or a specific aircraft type. The achievement of the Learning Objectives (LO) is registered in tests that are applied or taken along the three parts of the training, cited above (theory, practice and evaluation). This kind of training is regulated by aeronautical authorities, like the Federal Aviation Administration (FAA), European Aviation Safety Agency (EASA) and the Brazilian ANAC (Agencia Nacional de Aviação Civil), among others.

Computer based training, procedures training devices and simulation have thus been used for pilot training for a long time. See e.g., Covelli et al., "Using Mixed-Reality for Simulator Situation-Awareness," Interservice/Industry Training, Simulation, and Education Conference (2005), incorporated herein by reference. Nevertheless, the contents of the lessons applied for each phase are generally fragmented, even if they are complementary. In addition, the training devices used to train pilots on procedures are often mainly physical parts such as mechanical arrangements, most likely with screens where the aircraft's panels and simulations are displayed. Further improvements are possible and desirable.

BRIEF DESCRIPTION OF THE DRAWINGS

The following detailed description of exemplary non-limiting illustrative embodiments is to be read in conjunction with the drawings of which.

DETAILED DESCRIPTION OF NON-LIMITING EMBODIMENTS

The systems and methods here presented for pilot training provide simultaneous presentation of theory and practice in accordance with a set of Learning Objectives.

The systems and methods are associated with an apparatus comprising a computational system capable of displaying content from different types of media, including virtual reality, augmented reality, and variations. Example embodiments can for example produce a mixed reality environment that interacts with a human being, simulating the response of real objects, and also providing the necessary information to achieve the Learning Objectives for a specific part of a training. A register or record of the interactions is used for evaluation.

This example non-limiting application claims the benefit of the contents of for example:

i) Integrated training: theory, practice and evaluation in the same session;

ii) A training device for each trainee in the classroom;

iii) Early achievement of the Learning Objectives.

Virtual reality, augmented reality, and advanced computer interfaces are applied in order to get the most out of time, money and effort required for the training here described.

The example non-limiting technology herein aims to enable the first and the second part of the described training (e.g., the ground school and the procedures training). For doing so, it presents a new form of training, which combines: (a) the application of theory; (b) the practicing of the procedures in real time, and (c) a just-in-time evaluation. For doing so, it is useful for the trainee to be executing the training actions in a virtual and/or augmented environment. Such activities at the same time can be mentored and supported by a computer that applies the lessons and receives/registers the trainee's evaluation tests (FIG. 1B, block 110). Those lessons can also be followed in real time by an instructor, who can also review the lessons and evaluations recorded (FIG. 1B, block 108).

In the application of the lessons, the trainee can move his/her body parts, e.g., head, torso, arms and fingers, the same way that will be required in the real aircraft cockpit as well as in the full simulation used for training phase III. The example non-limiting system is comprised of devices that capture the trainee's movements, when he/she is seated in front of an apparatus that lies in a common desk for example. Sensors 3 capture the trainee's movements (FIG. 1B, block 102). The trainee will be wearing a virtual/augmented reality head-mounted-display (HMD) 4 that has enough precision to deliver images of the aircraft's virtual cockpit, together with the trainee's hands in movement, in real time (FIG. 1B, block 106).

Every hand movement of the trainee is decoded by the computer 2, in the context of the lesson being applied at that moment, and the virtual environment reacts accordingly, showing modifications in the virtual cockpit's displays, lamps, alarms, buttons, levers and sliders (physical mockup 5, see FIG. 1B, block 106).

The real world environment presents simple figures or stamps that are used to guarantee that the trainee's movements go precisely to the place of the action, whether it is a button, selector, lever, slider, sticker or other device or interface. When physical feedback is required over buttons, selectors, levers, sliders, stickers or any kind of interface for achieving the Learning Objectives (LOs), a physical mockup (5) of the specific part may be provided. The computed virtual and/or augmented reality generated on the head mounted display (HMD) 4 will, since the system requirements are satisfied, lie over or augment the real world image of that physical mockup. This example arrangement creates a mixed reality cockpit, where the trainee can practice procedures and perform actions over both virtual and physical parts or members, while the virtual and/or augmented reality provides a simulated response (e.g., including force feedback) corresponding to the action performed on a real cockpit. In example embodiments, the virtual cockpit, either with or without physical mockup, provides the right amount of room to have the dimensional space similar enough to the real cockpit, allowing the trainee to develop muscular or biomechanics memory that will be useful in flying a real airplane.

The instructional path provided by each lesson (FIG. 1B, block 104) is oriented to the operational issues and brings knowledge to the student. Such instructional paths can for example start from the controls, panels and interfaces, followed by the interaction with systems and with the individual behavior of its components. Such arrangements can use varied media contents that reach the student's cognition through the senses of sight, hearing, touch and movement of the hands and members interacting with the various controls.

One non-limiting embodiment of the system is portable, including for example the computer that coordinates the training. When desired, the mockup can use lightweight and inexpensive material and components.

The system also presents the trainee with two options for reviewing lessons anywhere: (i) a simple computer-based overview of the lessons, which can be run using a minimal configuration such as only a simple notebook computer or tablet (see FIG. 5), and (ii) a smartphone-based overview of the lessons for review and study. This allows the trainee to practice at home or at places other than in the fuller simulation environment.

One example non-limiting aspect provides a virtual airplane cockpit capable of receiving inputs from a human being and simulating the real world behavior in response to this interaction. The system allows one person to learn from the interaction with the controls and systems interfaces since first contacting them in the training session. The example non-limiting system delivers information in different formats and ways, reaching the trainee through various senses such as vision, hearing, touch and biomechanical movement. The system of delivering information provides a capability wherein the trainee is able to learn theoretical contents while interacting with systems controllers and interfaces in the real world. This interaction is performed following predetermined procedures, and doing so the theoretical and practical contents are learned together. The system may receive, log and process inputs from trainee's interaction to evaluate the achievement of the lesson goals. The system is designed to integrate the theory, practice and evaluation, all together on the same phase of training. The contents of lessons are oriented to real system operation and reflect the trainee's vision of the controllers and interfaces. The system can be used to replace computer based training (CBT) and procedures training devices (FTD). The system is able to reduce the time necessary to achieve the specific Learning Objectives.

Figure 1:
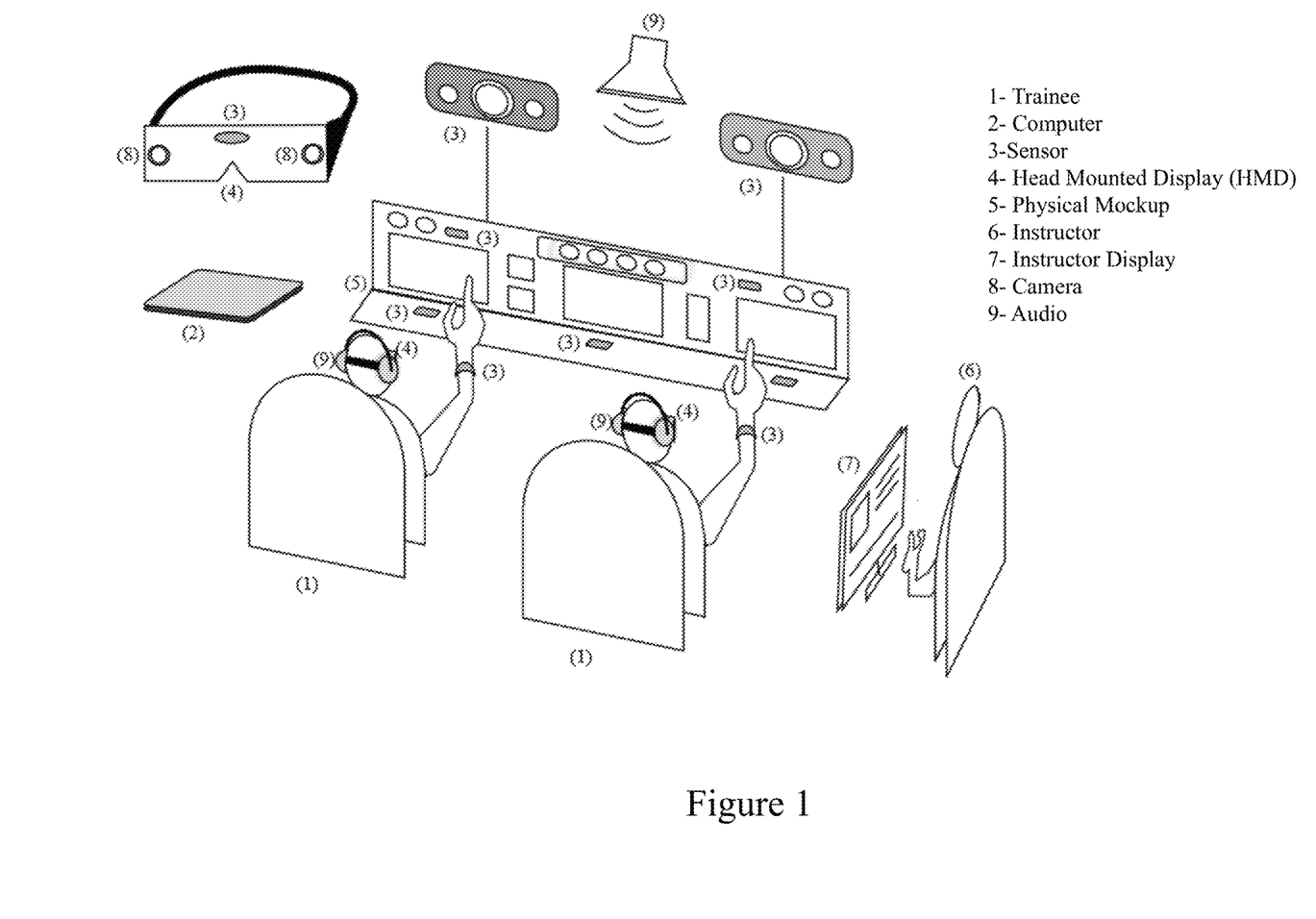
FIG. 1 shows the full example capability of an example non-limiting system embodiment.
Figure 1A:
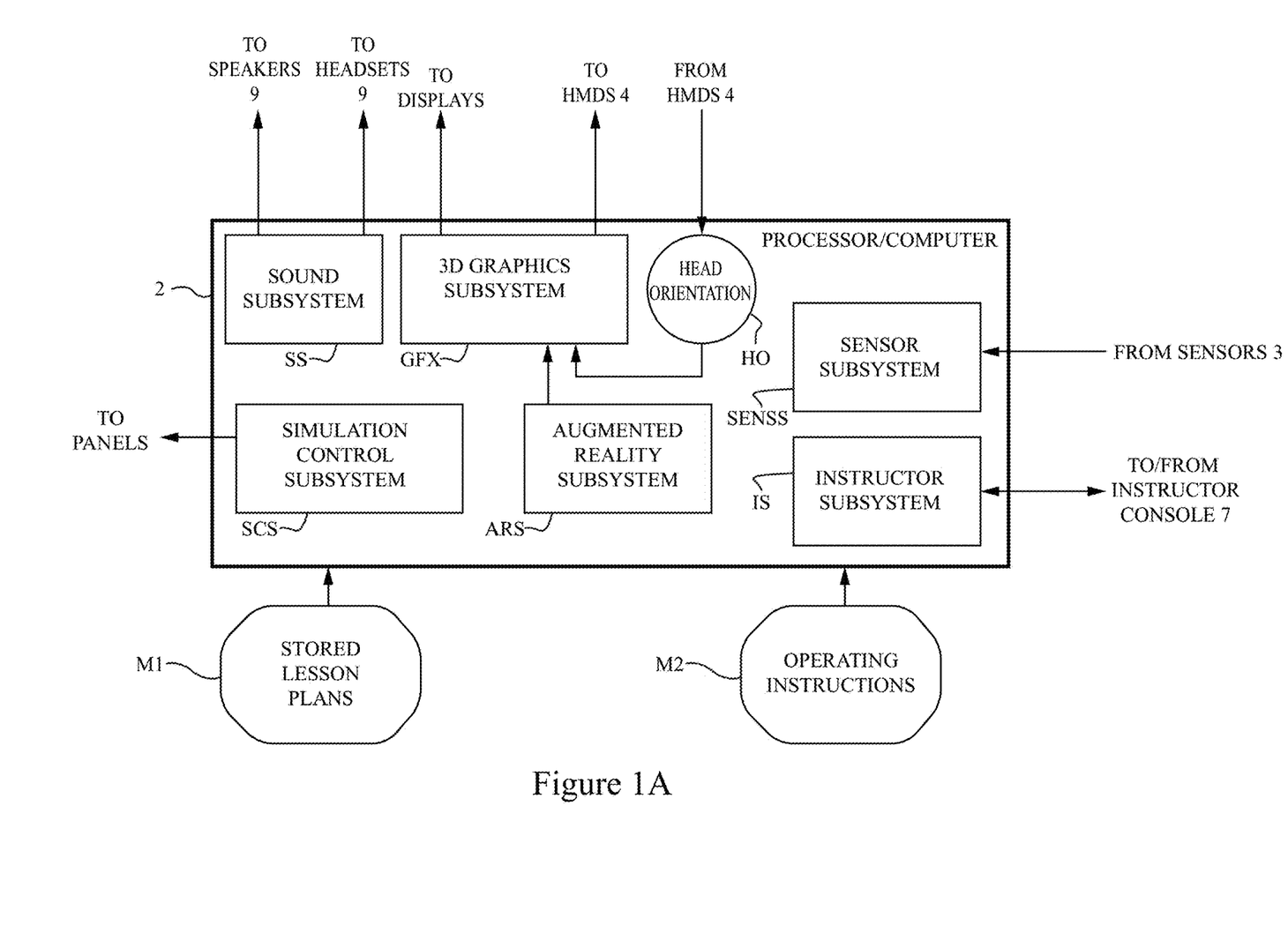
FIG. 1A shows an example non-limiting block diagram.
Figure 1B:
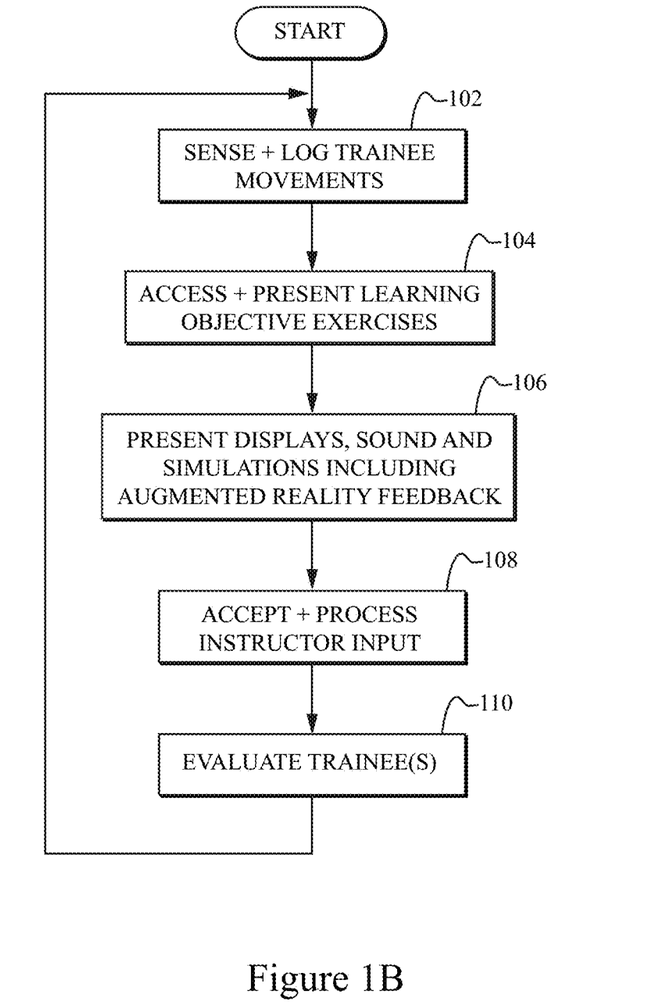
FIG. 1B shows an example software-controlled process.

FIGS. 1 and 1A show the full capability of an example system. In this version, two persons are interacting with the system; working as a crew. Each person can perform her tasks and also can see what the other person is doing. The system recognizes and registers the individual actions in order to evaluate the achievement of the lesson's goals for each trainee. A separate station 7 capable of reproducing all the audio and visual information delivered to the trainees is provided and allows an instructor/facilitator to follow the lesson's activities, and help and evaluate the trainee's performance.

The trainees in the example shown are wearing Head Mounted Displays (HMDs) 4 and sensors 3. The HMD's 4 can comprise for example goggles or glasses providing video displays. HMD's 4 may also include one or more forward-looking cameras 8, and head mounted orientation and/or position sensors 3 such as accelerometers, gyroscopes, magnetic position sensors, or a combination of same.

In one example non-limiting embodiment, HMD's 4 display an augmented reality view of the simulation environment that mixes real and virtual elements. For example, the operators can see (via camera or optical images that are displayed on or transmitted through the HMDs 4) their own first-person perspective of the environment, with superimposed virtual visual elements (from the same perspective as detected by the head-mounted sensors 3) such as day or night sky windshield views, views of a simulated runway for landings and takeoff, instrument readings, etc. When the operators change the position and/or orientation of their heads, sensors 3 detect this change and the system automatically adjusts the viewpoint and perspective of a displayed virtual scene. The operators may thus see different virtual elements (or the same virtual elements from different perspectives) based for example on different head positions and/or orientations or for other reasons. Furthermore, the system can maintain coherence between the virtual or augmented reality view that one operator sees vis-à-vis the virtual or augmented reality view that the other operator sees, so both operators can cooperate within the same virtual training environment.

Other sensors 3 are used to capture the position and movements of the trainee's body, specially focused on head, arm and finger moves. Such sensors 3 could include for example infrared retroreflectors, ultrasonic detectors or emitters, body-mounted inertial sensors such as accelerometers and/or gyroscopes, magnetic position sensors, or any combination of these. All information is sent to and processed by a computer system 2 that depicts or renders graphically those data, delivering a simulation of the real world in the form of virtual/augmented reality and its derivations. Such presentation may be complemented with a set of multimedia contents, enough to achieve the Learning Objectives from a specific lesson in a stored lesson plan M1.

In the example non-limiting embodiment, a physical mockup 5 is used with a simulated control subsystem SCS to provide the feeling of touch or tactile sensation, including e.g., force feedback. For example, a mockup of an airplane control console may be provided including manipulable controls such as buttons, knobs, joysticks, touch screens, dials, levers, lights, indicators, steering wheels, log book stations, navigational displays, informational displays, instrument displays, status displays, numerical displays, text displays, video displays, gauges, microphones, jacks, or any other desired type of device that may be present on an actual flight deck of an aircraft. The controls can operate realistically, and force or tactile feedback can be used to enhance the simulation. Audio is provided to the trainees and instructor/facilitator from sound subsystem SS through headsets and/or open speakers 9. The elaborateness and accuracy of the mockup 5 can dependent on the application; for example, since the HMD's 4 can supplement the real world with augmented reality in one embodiment, the physical mockup 5 can be less extensive and provide only those controls the operators should interact with and operate, with other visual elements being imaged by augmented reality.

In the context of FIG. 1, a main system may include a trainee (1) such as a certified pilot, seated in a common office chair. A computer (2) may comprise for example a generic or specialized computer system (see FIG. 1A), comprised by, but not limited to: a display, non-transitory memories storing instructions M1, M2 for execution by a processor/computer 2, a graphic card or other 3D graphics subsystem GFX, and devices to input data and control the training system. In more detail, referring to FIG. 1A, the computer system can include a processor/computer 2 including a sound subsystem SS, a 3D graphics subsystem GFX, a head orientation sensing or tracking system HO, a sensor subsystem SENSS, an instructor subsystem IS, and augmented reality subsystem ARS and a simulation control subsystem SCS. Such components may be provided by one or more dedicated processors, hardware components, software or firmware modules, or a combination. For example, the simulation control subsystem SCS may generate or run simulations such as simulated takeoffs, simulated landings, simulated weather threats, simulated collision threats, simulated course changes or maneuvers, or any other flight or other simulations. Such simulations can be based on stored lesson plans M1. The example non-limiting system will run the lessons, provided according to the Learning Objectives already scheduled for a specific certified training lesson.

The simulation control subsystem SCS may provide output to panel displays that are part of the physical mockup 5. Meanwhile, augmented reality subsystem ARS works in conjunction with head position/orientation tracking system HO to generate augmented reality elements for display on head mounted displays 4. A Head Mounted Display (HMD) (4) comprises a generic device that could deliver images in front of the trainee's eyes, so generating the vision of a synthetic world, filled and controlled by the computer (2). The HMD (4) often has one or more cameras (8) that can give to the trainee an indirect view of the environment. Other HMD arrangements provide transparent glasses that display virtual objects superimposed onto views of the real world.

The 3D graphics subsystem GFX generates desired images for display by transforming and rendering virtual 3D graphics objects and other elements from perspectives that depend on the position and orientation of the users' heads as tracked by head tracking system HO. In particular, computer 2 includes a head orientation system HO that detects head orientation using sensors 3 and provides orientation information to control graphical imagery in real time via the 3D graphics subsystem GFX and the augmented reality subsystem ARS.

3D graphics Sound subsystem SS generates audio including realistic sound effects such as engine roar, wind noise, weather noise, simulated received radio messages, and the like as well as instructor communications and directions in order to enhance the simulation. The HMD's (4) have two earphones for audio interaction with the trainees.

Sensor subsystem SENSS tracks additional body movements of the operators by using sensors 3 to monitor the position and/or orientation of body parts. One or more sensors (3) comprise a combination of devices that capture visible and infra-red light, combining precision for close and far capturing of the subjects, working altogether with sensors that capture, measure or evaluate the movements of arms and fingers and the sensor subsystem SENSS. Sensor subsystem SENSS also in the example non-limiting embodiment is able to sense manipulation and position of controls that are part of physical mockup 5.

Physical mockup (5) may comprise an apparatus that lies in front of the trainee and on a simple office table, which is used to support the trainee's arms. The apparatus could often have physical simplified representations of the real lamps, alarms, buttons, levers and sliders on board an aircraft, in order to give to the trainee the realistic impressions of reach, movement, touch, and tactile sensing. The apparatus often has the graphical representation of the real aircraft cockpit that can be reached by the trainee, if needed. Other mockups 5 could be less elaborate.

An instructor subsystem IS may communicate with instructor console 7 to provide information to and receive information from an instructor. Commands the instructor subsystem IS receives from the instructor may influence the simulation provided by the simulation control subsystem SCS as one example. For example, instructor subsystem IS can be used to select, start and stop simulations based on stored lesson plans or to dynamically alter or affect ongoing simulations.

An instructor (6), such as a certified person who is able to verify if the trainee reached the Learning Objectives (LO), is also involved in training and observing. An Instructor Display (7) allows the instructor to, via instructor subsystem IS, use a computer that replicates the trainee's actions in a display separated from the main installation.

Figure 2:
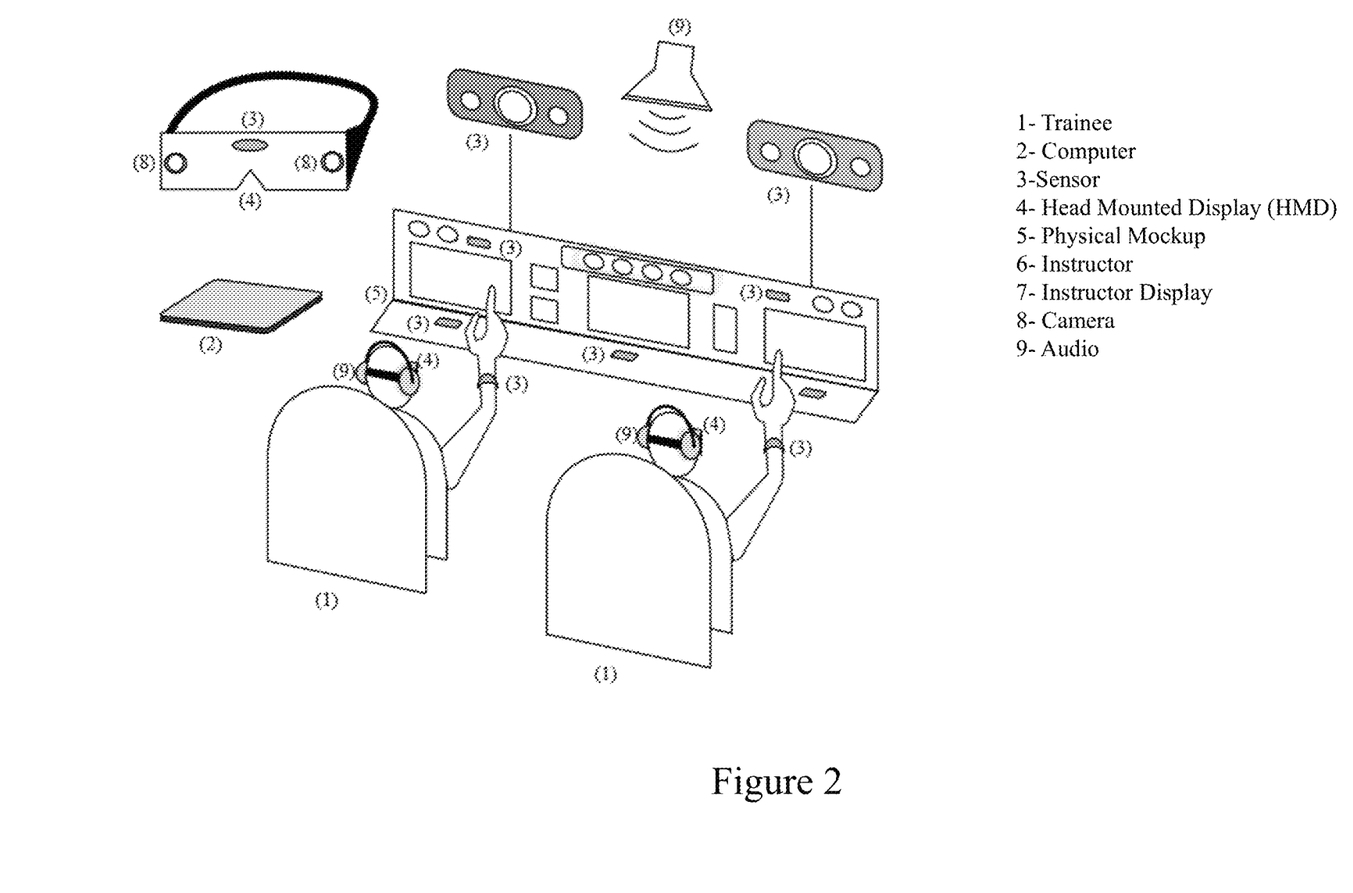
FIG. 2 shows an additional example embodiment computer system that delivers all necessary information to guide a lesson for two trainees, and register and evaluate the trainees' performance.

While an instructor console is useful in many contexts, it can be dispensed with in other applications. FIG. 2 shows an option where the computer system delivers all necessary information to guide a lesson for two trainees, to register and evaluate the trainee's performance. The lesson is performed with no need of an instructor/facilitator at the time when it is applied.

Figure 3:
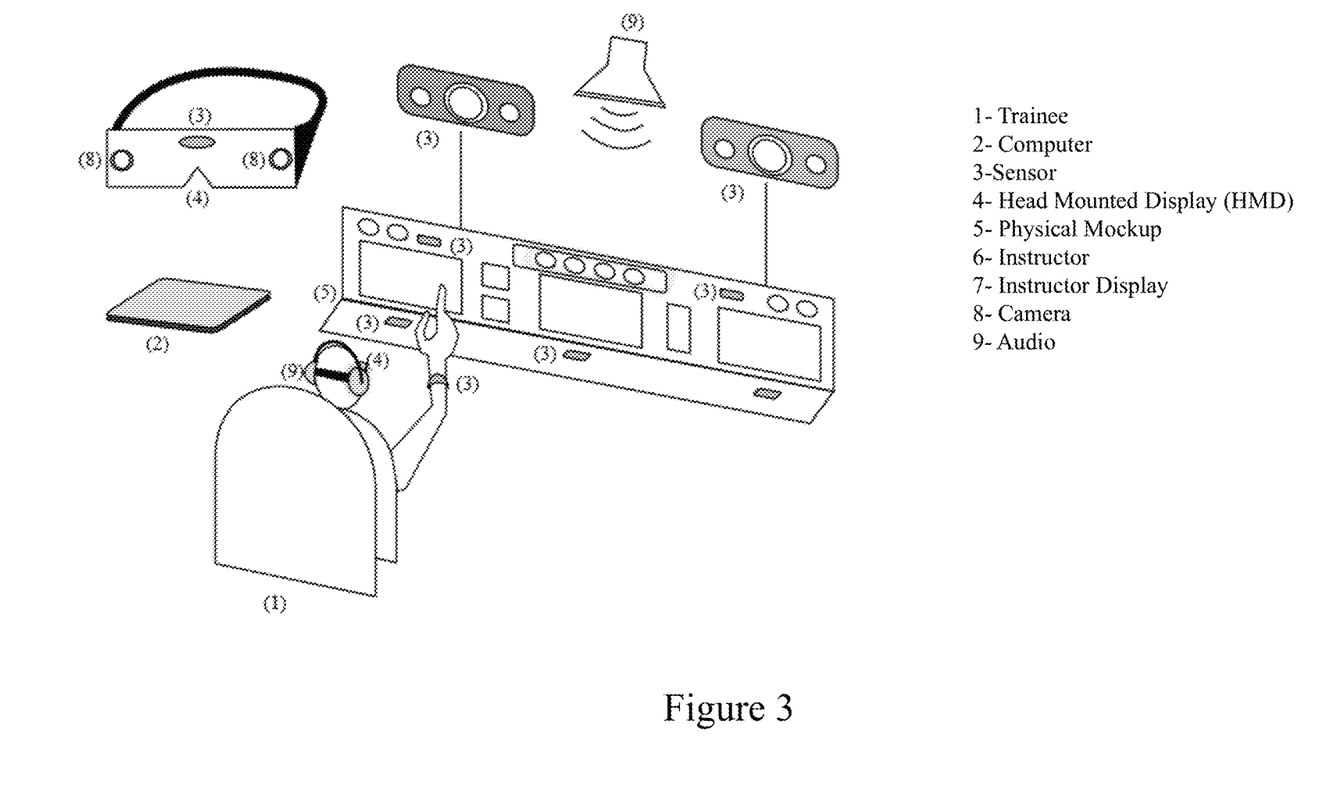
FIG. 3 shows an additional example embodiment computer system that delivers all necessary information to guide a lesson for a single trainee, and register and evaluate the trainee's performance.

Similarly, while coordinating the efforts of two trainees (e.g., pilot and copilot) are useful in some contexts, training a single participant at a time may also be useful in other contexts. FIG. 3 shows an option where the computer system 2 delivers all necessary information to guide a lesson for a single trainee, to register and evaluate the trainee's performance. The lesson is performed with no need of an instructor/facilitator or second pilot or co-pilot trainee at the time when it is applied.

Figure 4:
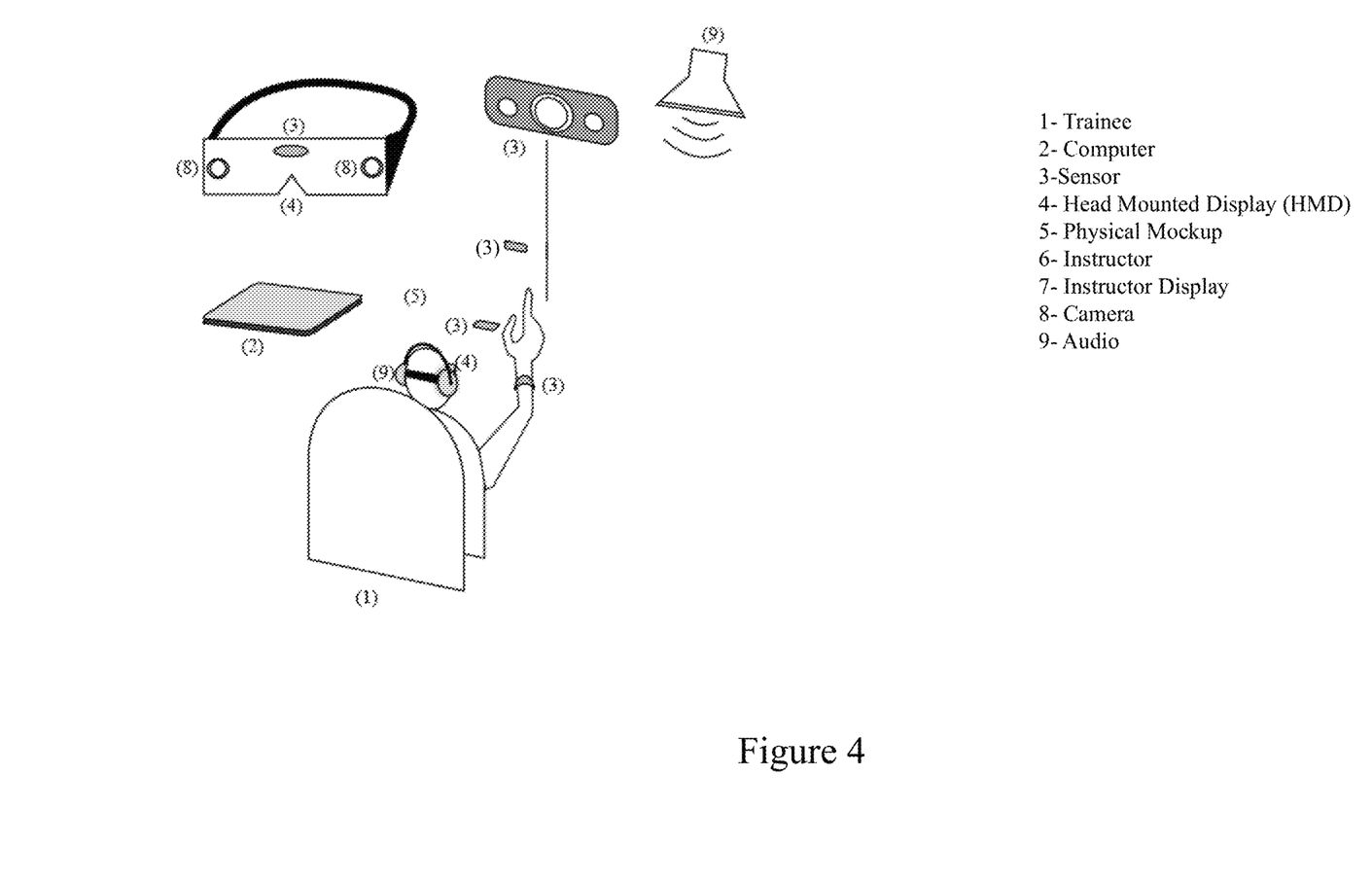
FIG. 4 shows an example non-limiting embodiment where no physical mockup is used, and the computer system delivers all necessary information to guide a lesson for a single trainee, and register and evaluate the trainee's performance.

FIG. 4 shows an option where no physical mockup is used or required, and the computer system delivers all necessary information to guide a lesson for a single trainee, to register and evaluate the trainee's performance. The lesson is performed with no need of an instructor/facilitator at the time when it is applied.

Figure 5:
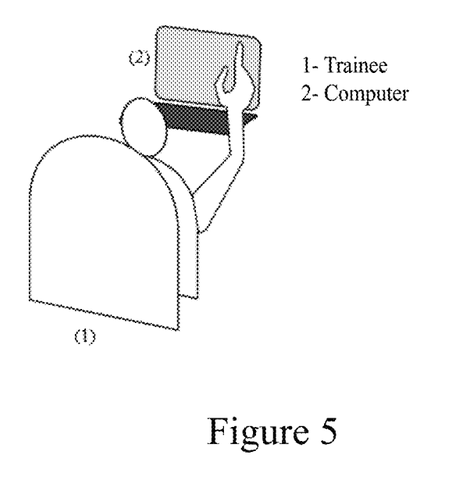
FIG. 5 shows an example non-limiting overview of lessons and systems available to be used on an example laptop, tablet or smartphone.

FIG. 5 shows an overview of example embodiments for lesson and systems available to be used on simple laptop, tablet or smartphone.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed:

1. A virtual airplane cockpit system structured to receive inputs from first and second human operators and provide a simulation environment simulating real world behavior in response to the inputs, comprising:
a physical mockup of an aircraft cockpit including user-manipulable physical controls attached to sensors, the sensors providing output signals indicating the manipulation states of the physical controls;
at least one tracking device that tracks the position, orientation and/or movement of the head, torso, arms, hands and fingers of each of the first and second human operators;
an augmented reality generator that, in response to the tracked position, orientation and/or movement of the head, torso, arms, hands and fingers of the first and second human operators, generates an augmented reality simulation image for overlay onto the first and second human operators' real world image perception of the physical mockup, the augmented reality generator enabling the first human operator to view the hands of the second human operator and what the hands of the second human operator interact with; and
at least one processor operatively coupled to the augmented reality generator, the at least one processor being responsive to the tracked position, orientation and/or movement of the head, torso, arms and fingers of the first and second human operators, the at least one processor controlling the augmented reality generator to generate augmented reality simulation images and associated audio signals that present objective learning exercise and present simulations including augmented reality feedback, wherein the at least one tracking device tracks movement of the first and second users' head, torso, arms and fingers the same way as will be required in a real aircraft cockpit.

2. The system of claim 1 further including a simulation subsystem that allows the first and second human operators to learn from interaction with the control and other systems interfaces since the first contact.

3. The system of claim 1 further including an output interface that delivers information in different formats and ways, reaching the first and second human operators through various senses including vision, hearing, touch and biomechanical movement.

4. The system of delivering information of claim 3, wherein the first and second human operators are able to learn theoretical contents while interacting with systems controllers and interfaces following predetermined procedures, wherein the theoretical and practical contents are learned together.

5. The system of claim 1 further including at least one processor that receives, logs and processes the inputs from the first and second human operators' interactions to evaluate the achievement of lesson goals.

6. The system of claim 1 wherein the at least one processor is configured to integrate theory, practice and evaluation, all together on the same phase of training.

7. The system of claim 6 wherein the at least one processor is further configured to provide contents of lessons that are oriented to real system operation and reflect the first and second human operators' visions of the controllers and interfaces.

8. The system according to claim 1, configured to replace computer based training (CBT) and procedures training devices (FTD).

9. The system according to claim 1, configured to reduce the time necessary to achieve specific Learning Objectives.

10. A virtual airplane simulator providing a simulation environment, the simulator comprising:
a physical mockup of an aircraft cockpit including at least one user-manipulable physical control attached to at least one sensor, the sensor providing an output signal that indicates the manipulation state of the physical control;
at least one tracking device that tracks the position, orientation and/or movement of the head, torso, arms, hands and fingers of first and second human operators;
at least one processor coupled to tracking device, the at least one processor including a sound subsystem, a 3D graphics subsystem, a simulation control subsystem, an augmented reality subsystem and a sensor subsystem;
a first head mounted display for use by the first human operator;
a second head mounted display for use by the second human operator;
the simulation control subsystem being coupled to at least one non-transitory memory device storing lesson plans providing Learning Objectives;
the augmented reality generator being configured to, in response to the tracked position, orientation and/or movement, generate an augmented reality simulation image for the first and second head mounted displays to overlay onto the first and second human operators' real world image perception of the physical mockup through the first and second head mounted displays, the augmented reality generator being further configured to enable the first and second human operators to see each others' head, torso, arms, hands and fingers and what the head, torso, arms, hands and fingers interact with,
wherein the system is configured to generate augmented reality simulation images and sounds for both a pilot and a co-pilot simultaneously as a team; and
the simulation control system is further configured to be responsive to the tracked position, orientation and/or movement of the head, torso, arms and fingers of the first and second human operators, the simulation control system controlling the augmented reality generator to generate augmented reality simulation images and associated audio signals that present the Learning Objectives and require augmented reality feedback, wherein the at least one tracking device tracks movement of the first and second users' head, torso, arms and fingers the same way as will be required in a real aircraft cockpit.

11. The simulator of claim 10 wherein the first head mounted display is structured to provide a transparent portion that permits the first human operator to view the real world physical mockup and the interactions of the hands of the second human operator with the real world physical mockup, and superimposes display of virtual objects the second human operator's hands interact with onto the first human operator's view through the transparent portion of the real world physical mockup.

12. The simulator of claim 10 wherein the tracking device includes sensors that capture, measure or evaluate the movements of arms, hands and fingers of the first and second human operators and also sense manipulation by the hand and finger movement and position of physical controls that are part of the physical mockup.

13. The simulator of claim 10 wherein the physical mockup comprising real lamps, alarms, buttons, levers and sliders that give, to the first and second human operators' hands and fingers, realistic impressions of reach, movement, touch and tactile sensing.

14. The simulator of claim 10 wherein the physical mockup comprises hand-manipulable elements selected from the group consisting of buttons, knobs, joysticks, touch screens, dials, levers, lights, indicators, steering wheels, log book stations, navigational displays, informational displays, instrument displays, status displays, numerical displays, text displays, video displays, gauges, microphones, jacks, or other devices that may be present and manipulated by hands on an actual flight deck of an aircraft.

15. The simulator of claim 10 wherein the control provides force feedback to the first and second operators' hands and fingers.

16. The simulator of claim 10 wherein the tracking device tracks at least one hand of each of the first and second human operators and the augmented reality generator generates virtual images that enable the first and second human operators to see the same hand-manipulable virtual elements from different perspectives based on different head positions and/or orientations.

17. The simulator of claim 10 wherein the simulation control system sense when the operators change the position and/or orientation of their heads and automatically adjusts the viewpoint and perspective of a displayed virtual scene for each of the operators so the operators see different virtual elements or the same virtual elements from different perspectives based on their different head positions and/or orientations while maintaining coherence between the different viewpoints and perspectives.

* * * * *